United States Patent
Elappuparackal

(10) Patent No.: US 6,822,478 B2
(45) Date of Patent: Nov. 23, 2004

(54) DATA-DRIVEN CLOCK GATING FOR A SEQUENTIAL DATA-CAPTURE DEVICE

(75) Inventor: Tony T. Elappuparackal, Stafford, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/185,360

(22) Filed: Jun. 28, 2002

(65) Prior Publication Data

US 2003/0006806 A1 Jan. 9, 2003

Related U.S. Application Data

(60) Provisional application No. 60/302,805, filed on Jul. 3, 2001.

(51) Int. Cl.[7] .............................................. H03K 3/037
(52) U.S. Cl. ............................ 326/46; 326/93; 326/95; 327/199; 327/144; 327/225; 327/230
(58) Field of Search ............................... 326/46, 93, 95, 326/98; 327/144–146, 199, 225, 230

(56) References Cited

U.S. PATENT DOCUMENTS

| | | | | | |
|---|---|---|---|---|---|
| 5,233,617 | A | * | 8/1993 | Simmons et al. | 714/814 |
| 5,498,988 | A | * | 3/1996 | Reyes et al. | 327/199 |
| 5,638,015 | A | * | 6/1997 | Gujral et al. | 327/144 |

* cited by examiner

Primary Examiner—Vibol Tan
(74) Attorney, Agent, or Firm—Robert D. Marshall, Jr.; W. James Brady, III; Frederick J. Telecky, Jr.

(57) ABSTRACT

A circuit for capturing data from a bus having a flip-flop register, comparison logic and clock logic. The comparison logic determines whether any bit on the bus has changed logic state. If a bit has changed state, the comparison logic asserts an enable signal which causes the clock logic to clock the register. Accordingly, data from the bus is not clocked through the register unless the data has actually changed state and the comparison logic itself determines whether different data is present on the bus.

16 Claims, 3 Drawing Sheets

DATA-DRIVEN CLOCK GATING FOR A SEQUENTIAL DATA-CAPTURE DEVICE

CROSS-REFERENCE TO RELATED APPLICATIONS

This application claims priority under 35 USC §119(e)(1) of Provisional Application No. 60/302,805, filed Jul. 3, 2001.

STATEMENT REGARDING FEDERALLY SPONSORED RESEARCH OR DEVELOPMENT

Not applicable.

BACKGROUND OF THE INVENTION

1. Field of the Invention

The present invention generally relates to capturing data on a multi-channel bus. More particularly, the invention relates to clock gating of sequential devices such as flip-flops or latches used to capture said data. More particularly still, the invention relates to a technique for enabling a clock signal to a sequential device upon detection of a change in the incoming data.

2. Background of the Invention

Modern semiconductor manufacturing technology makes it possible to produce integrated circuits (ICs) with complex circuits and millions of transistors on a single device. Discrete devices such as application specific integrated circuits (ASICs) perform a multitude of tasks and replace circuits that formerly required whole circuit card assemblies. Hence, the industry term "System on a Chip" (SOC) accurately reflects the ability to produce complex processing systems in a small amount of space. Microprocessors also generally reflect this miniaturization trend and include a variety of logic circuits fabricated on a single semiconductor chip. It is generally desirable for ICs such as processors to be compact, consume very little power, and generate as little heat as possible. This is especially true for processors that reside in small, battery-powered devices such as cellular telephones, pagers, and the like. However, as chip density continues to increase, heat dissipation and power reduction become more difficult to achieve.

One area of focus for reducing power consumption in ICs and microprocessor designs is clock signals. Clock signals are periodic signals that oscillate between high and low voltages many times per second. For example, a 500 MHz clock signals transitions from a high voltage to a low voltage and back to the high voltage (one clock cycle) 500 million times per second. In general, clock signals are used to trigger digital devices to perform a function. One common type of device that uses a clock signal is a "flip-flop." A flip-flop receives an input data signal that may vary between two logic states (high and low). Upon detecting an edge (transition from low to high or high to low) of a clock input signal, the flip-flop samples and holds the state of the input data signal and causes the output signal of the flip-flop to transition to that state and remain at that state until the flip-flop is clocked again.

It is well known that routing a clock signal to many devices can cause significant energy losses due to the capacitive loading of the devices and of the signal paths themselves. Further, a flip-flop requires more power to actively sample and hold the input data signal upon being "clocked" than it requires in its idle state when the flip-flop is not being clocked. In a typical system, many flip-flops may be clocked by a single clock signal. Further, there may be numerous clock signals in a given system. Thus, when clock signals change state in a typical system, numerous flip-flops clock their input signals thereby causing an associated spike in power usage. This increase in power usage can be significant and also causes a rise in heat generation. Thus, it is desirable to reduce the load placed on clock sources. This can be accomplished by reducing the number of devices that must be clocked and/or by reducing the frequency with which clocked devices are switched.

FIGS. 1–3 show several conventional techniques for clocking flip-flops. In each Figure, flip-flop 10 is implemented as a "D-type" flip flop well known to those of ordinary skill in the art. In FIG. 1, flip-flop 10 is clocked every time the input clock signal (CLKin) changes from a low to a high logic level (i.e., every rising edge). A multiplexer 12 is also included which provides either the input data value (Din) or the previously captured value (Qout) to the flip-flop's D input. With this clocking scheme, flip-flop 10 is clocked on every rising edge of the CLKin signal regardless of whether the input data Din has actually changed or not. As such, the flip-flop 10 consumes power to latch data even if the data has not changed.

Using the multiplexer, the flip-flop 10 either clocks in the previously sampled data (Qout) or new data (Din) depending on the state of the enable signal (En). The enable signal (En) is typically generated by another device (not shown) that knows when the data, Din, has changed state. For example, in the case of a bus, the device that asserts the enable signal may be a bus master that changes the data and, at the same time, asserts the enable signal to tell the flip-flop that new data is ready to be captured. In the circuit shown in FIG. 1, because the enable signal and the data are asserted at the same time, this clocking method is called "synchronous load-enable clocking."

The losses generated by constantly switching the flip-flops 10 in synchronous load-enable clocking schemes are reduced by implementing a gated clock circuit as shown in FIG. 2. As shown, a logic gate 20 (e.g., an AND gate) is used to turn off the clock (CLKin) to flip-flop 10 when that device does not need to be clocked. With a gated clock, the enable signal (En) that controls the select line on the multiplexer 12 shown in FIG. 1 now controls the AND gate 20 shown in FIG. 2. Unless both the enable signal (En) and the clock signal (CLKin) are logically high, the gated clock signal (GCLK) will remain at a constant deasserted level and the flip-flop 10 will not clock the input data (Din). Disabling the clock signal in this manner saves on clock power since the local clock line (GCLK) to flip-flop 10 is not continuously toggling between high and low states. The advantage of this embodiment is particularly useful when the same clock signal is used to trigger multiple devices. By effectively turning off the clock signal to multiple devices, the capacitive load normally generated by those devices decreases considerably.

An unfortunate problem with the clock-gating example shown in FIG. 2 is that the AND gate 20 may produce glitches or unintended spikes in the GCLK signal. This may occur, for example, when the enable signal falls after the input clock signal rises or, conversely, when the enable signal rises just before the input clock signal falls. In either case, it is possible, if both signals are high even for a small period of time, that a spike will appear in the GCLK signal. It is preferable that the GCLK signal that is, used to trigger the flip-flop 10 be uniform (i.e., each cycle in the clock signal be the substantially the same). Otherwise, the flip-flop 10 may spuriously latch the data or the setup and hold times for the flip-flop 10 may be violated. If the input data is not present for a required period of time before (setup) and after (hold) the input clock causes the flip-flop 10 to clock the data, then the data may not be reliable.

The third example shown in FIG. 3 remedies this condition by providing a "latch" 30 as an input to the AND gate 20 to hold the enable signal (En) high at least through the end of the current clock cycle. A latch may be distinguished from a flip-flop by the way the devices trigger the data-capture feature. A latch is a clock level-sensitive device while a flip-flop is a clock edge-sensitive device. In other words, a latch will capture data if a clock signal driving the latch is high or low while a flip-flop captures data only on rising or falling clock edges. The latch 30 shown in FIG. 3 captures input data when the input clock is low. Thus, if the enable signal is high during a low transition of the input clock, a high output will appear at the output (LQ) of the latch 30. On the subsequent low to high transition of the input clock, the AND gate 20 will generate a high signal (GCLK) that remains high for at least half of a clock cycle and permits timely capturing of data as it arrives at flip-flop 10.

A drawback to each of the conventional approaches discussed above is that they all require some prior knowledge that the incoming data is ready to be captured. As noted above, a separate device (not shown), such as the logic that generates the data to be latched (Din) generates the enable signal (En) when the data has changed from its previous state and needs to be clocked by flip-flop 10. There may be occasions, however, during which it is difficult or impossible to know that data is being transmitted. It may also be impractical to include the logic needed to generate the enable signal. It is therefore desirable to provide an improved technique for enabling a clock signal that addresses these problems. Despite the advantages such a technique would provide, to date no such technique is known to exist.

BRIEF SUMMARY OF THE INVENTION

Accordingly, the preferred embodiment of the present invention comprises a data driven clock gating circuit which clocks data only when the circuit determines that the logic state of the data has actually changed state. The data driven clock gating circuit preferably comprises a flip-flop, comparison logic and clock logic. Upon assertion of a gated clock signal, the flip-flop clocks in the data. The comparison logic compares the logic state of the data to the previously captured data. If the data has changed state, the comparison logic asserts an enable signal to the clock logic. The clock logic generates the gated clock signal only when the enable signal is asserted (indicating that new data is present on the bus).

The comparison logic preferably comprises an exclusive OR gate or exclusive NOR gate coupled to the latch to determine when the bus data has changed. The exclusive OR or NOR gate receives as input signals the current data and the old, previously captured data. The output signal from the exclusive OR or NOR gates becomes asserted only if the current and previously captured data do not match, which indicates new data is present.

The clock logic is preferably implemented as a gated clock circuit, but may also be implemented as a synchronous load-enable clock circuit. The enable signal from the comparison logic is preferably coupled to the input of the clock logic. An external input clock is also provided to the input of the clock logic. The clock logic preferably forwards the external input clock to the flip-flop(s) only when the enable signal from the comparison logic is asserted. The clock logic may include a latch that receives the enable signal from the comparison logic to prevent signal glitches that might otherwise arise from the clock logic.

If desired, the data driven clock gating circuit described above can be applied to multiple bits on a bus. A flip-flop may be provided for each bit on the bus. The comparison logic preferably includes an exclusive OR or NOR gate for each such latch. The comparison logic also includes other combinatorial logic to assert an enable signal when any one or more of the bits on the bus change state.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms "microprocessor" and "DSP" are intended to be used interchangeably unless otherwise stated. Additionally, the terms "register" and "flip-flop" are generally intended to be synonymous since a register typically comprises a bank of flip-flops.

DETAILED DESCRIPTION OF THE PREFERRED EMBODIMENTS

The preferred embodiments described herein show an improved clock circuit that solves the problems noted above. These embodiments can be used in connection with any type of device that receives a clock signal for operation. Although the embodiments discussed below show the improved clocking methodology in terms of a D flip-flop, numerous other types of clocked logic devices could benefit from the solutions provided below. Further, the preferred embodiments described herein can be implemented in an integrated circuit such as a microprocessor or, more particularly, a digital signal processor.

Figure 4:
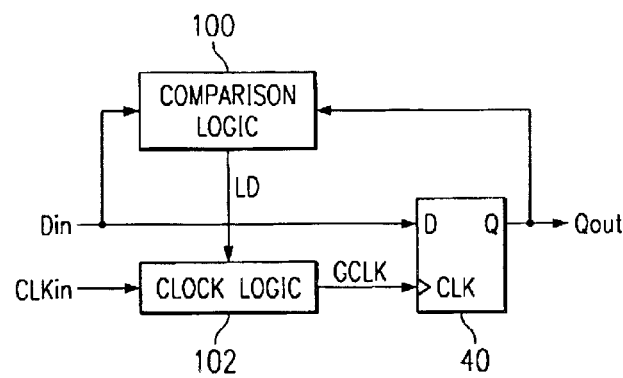
FIG. 4 shows a preferred embodiment of a data-driven clock gating circuit using comparison logic to detect when the input data value changes.

Referring now to FIG. 4, a data driven clock gating circuit is shown constructed in accordance with the preferred embodiment. As shown, a single flip-flop 40 couples to comparison logic 100 and clock logic 102. An input data value, Din, is provided to flip-flop 40 and comparison logic 100. The latched output value is represented by Qout. Input clock signal CLKin is provided by an external clock source (not shown) to clock logic 102.

The comparison logic 100 receives the current data bit, Din, and the previously clocked data, Qout, as input values, and generates an output enable signal, LD, which is provided to the clock logic 102. The comparison logic 100 compares Din and Qout to determine whether they are at the same logic state or at different logic states. If Din and Qout are at the same state (i.e., both high or both low), comparison logic 100 deasserts its output LD signal. A deasserted LD signal prevents clock logic 102 from generating a gated clock signal, GCLK, to flip-flop 40. Thus, if the input data, Din, has not changed state from the previously clocked data, Qout, an active clock signal is not provided to flip-flop 40 and flip-flop 40 is not able to sample and hold the input value at its D input.

If the comparison logic 100, however, determines that the input data value, Din, has changed state from the previously latched output value, Qout, the comparison logic 100 asserts the LD signal to the clock logic 102 which responds by generating a GLCK signal to flip-flop 40. With an asserted GCLK signal, flip-flop 40 clocks in the newly changed input data value, Din. In this manner, flip-flop 40 is clocked only when the input data is different than the previously clocked data. By comparing the current input data value to the previously clocked data, the comparison logic 100 shown in FIG. 4 is able to determine when the input data has changed, and the latching circuit need not rely on an externally asserted enable signal.

Figure 5:
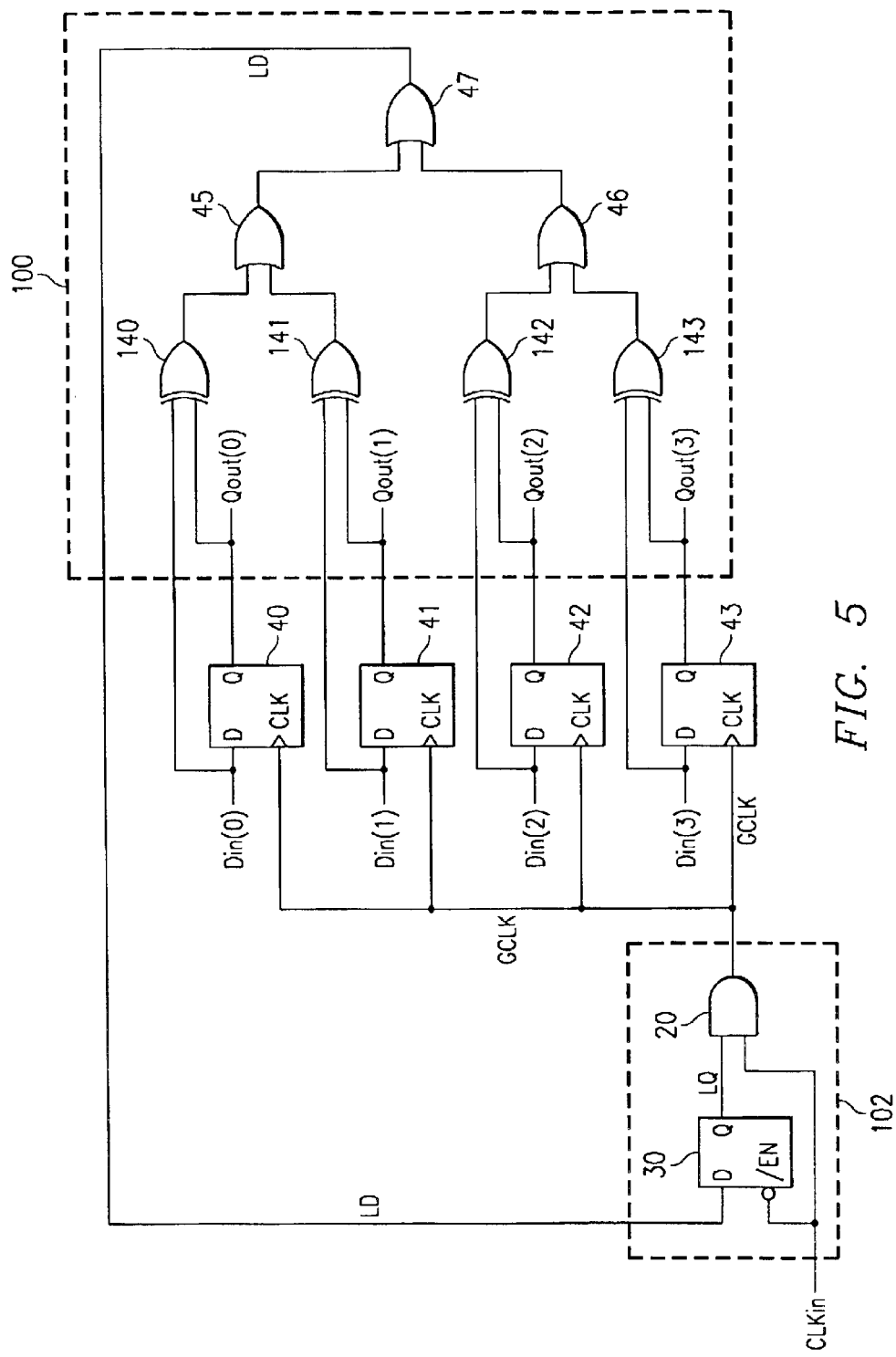
FIG. 5 shows a preferred embodiment of the comparison logic of FIG. 4.
Figure 6:
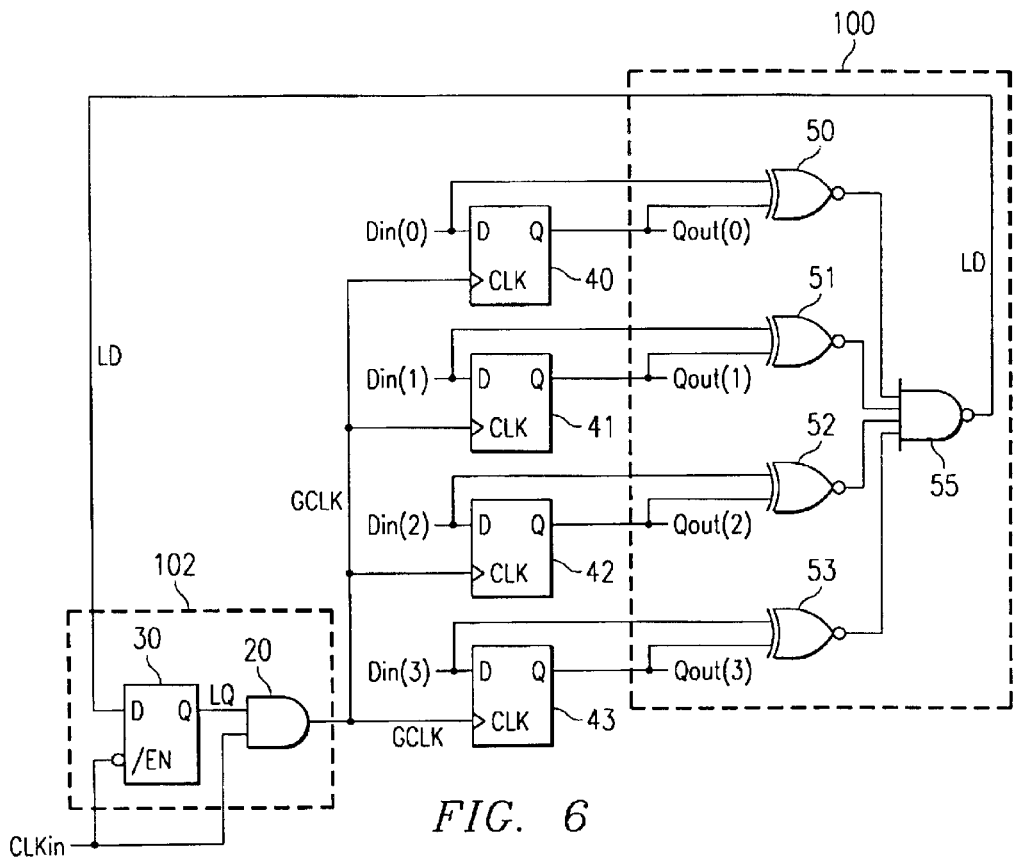
FIG. 6 shows an alternative embodiment of the comparison logic of FIG. 4.

FIGS. 5 and 6 illustrate two different embodiments of comparison logic 100 as well as an embodiment of clock logic 102 in the context of a multiple bit signal bus. Referring first to FIG. 5, a preferred embodiment of the data-driven clock gating technique is used to capture data transmitted on a 4-bit-data bus. In FIG. 5, the four data channels are represented by the Din(0), Din(1), Din(2), and Din(3) signals. A flip-flop 40–43 is provided to capture an input value Din(N). The circuit shown generates the gated clock signal GCLK that clocks each of the flip-flops 40–43. In accordance with the preferred embodiment, the comparison logic 100 comprises exclusive OR (XOR) gates 140–143 coupled to the output terminal of each flip-flop 40–43, as well as OR gates 45–46 as shown. The output signals from XOR gates 140 and 141 are provided as input signals to OR gate 45. Similarly, the output signals from XOR gates 142 and 143 are provided as input signals to OR gate 46. The output signals from OR gates 45, 46 are combined together by OR gate 47 which generates the LD enable signal to the clock logic 102.

Clock logic 102 preferably comprises an AND gate 20 and a latch 30. The output signal from latch 30 couples to an input signal of AND gate 20. In addition, the input clock signal, CLKin, is provided as the enable signal to latch 30 and an input signal to AND gate 20. The LD signal from OR gate 47 is provided as the input data signal to latch 30. The output signal from AND gate 20 represents the gated clock signal, GLCK, which is provided to each of the flip-flops 40–43.

As shown, the input signals to the exclusive OR gates 140–143 are the input data value, Din(N), and the previously latched data, Qout(N). As is recognized by those skilled in the art, an exclusive OR gate will generate a logic high output signal only if the input signals to the gate differ from one another. That is, the output signals from each XOR gate 140–143 will only be at the logic high state if the input Din(N) to each gate is different than the previously latched data Qout(M). Thus, the XOR gate is used as the means to provide the comparison function in comparison logic 100.

Referring still to FIG. 5, the OR gates 45–47 are used to combine the output signals from the exclusive OR gates 140–143 together to produce a single output LD value which the clock logic 102 can use to determine if any of the input data values, Din(N), have changed. Given the configuration shown in FIG. 5, OR gate 47 will assert the LD output signal if any of the exclusive OR gates 140–143 generate a logic high signal indicating that an input data bit has changed. Moreover, if the data on any channel in the data bus changes from the last time the data was latched, the LD signal will be asserted high by comparison logic 100.

The output enable signal from OR gate 47 is fed back to the D input of latch 30 and causes latch 30 and AND gate 20 to clock each of the flip-flops 40–43. In accordance with the preferred embodiment and as explained above, the enable signal, LD, is asserted by the comparison logic 100 by monitoring the data bus, Din(N), for changes in logic state of any of the bits comprising the bus.

If signal LD goes high in response to a data change in any channel of the data bus, then latch 30 will capture this value when the input clock signal CLKin is low and forward this value to the latch output signal LQ. On the subsequent low-to-high transition of CLKin, AND gate 20 will generate a logic high value for the gated clock signal GCLK that, in turn, clocks flip-flops 40–43, thereby capturing the data from the bus.

The XOR and OR logic gates 140–143 and 45–47 may operate on relatively slow switching data channels and, if so, do not contribute substantially to power loss. In fact, the losses incurred in the preferred embodiment may be comparable to, if not lower than, losses incurred by control circuitry in conventional systems that is needed to generate an enable signal as noted above.

The logic shown in the exemplary embodiment of the comparison logic 100 shown in FIG. 5 does, however, cause a three gate propagation delay that affects the setup requirements for the flip-flops 40–43 in the input register. This delay increases as the size of the data bus increases. One additional OR gate stage is required for a 2x increase in the data bus. For example, if four more channels are added to the bus shown in FIG. 5, the logic gates shown may be replicated for the additional channels, but one additional OR gate (with the outputs of OR gate 47 and its equivalent as its inputs) is required. This gate delay may be alleviated by implementing alternative logic designs. For example, in the embodiment shown in FIG. 6, OR gates 45–47 may be replaced with a single 4-input logic gate, which effectively eliminates a full stage of propagation delay.

Referring now to FIG. 6, an alternative (and potentially faster) design for comparison logic 100 is shown to create the clock enable signal (LD). In this embodiment, comparison logic 100 comprises exclusive NOR gates (XNOR) 50–53 in place of the XOR gates 140–143 of FIG. 5. Furthermore, a single NAND gate 55 replaces the OR gates 45–47 of FIG. 5. As with the XOR gates in FIG. 5, the XNOR gates 50–53 assert a signal when the data on their respective channels change. However, in FIG. 6, the XNOR gates 50–53 generate a logic low signal when the associated data bit Din(N) changes from the previously clocked data Qout(N). Like XOR gates 140–143, XNOR gates 50–53 also comprise a means for determining when an input data bit has changed. Under normal operating conditions, when the Din(N) values are equal to the Qout(N) values, the outputs of all XNOR gates 50–53 are high. As a result, NAND gate 55 normally outputs a logic low signal to latch 30. However, if the output of a single XNOR gate 50–53 changes to a low level (due to a change in a data bit), the NAND gate 55 responds by asserting the LD signal to a high logic level. The clock logic 102 remains identical to that of FIG. 5.

Figure 7:
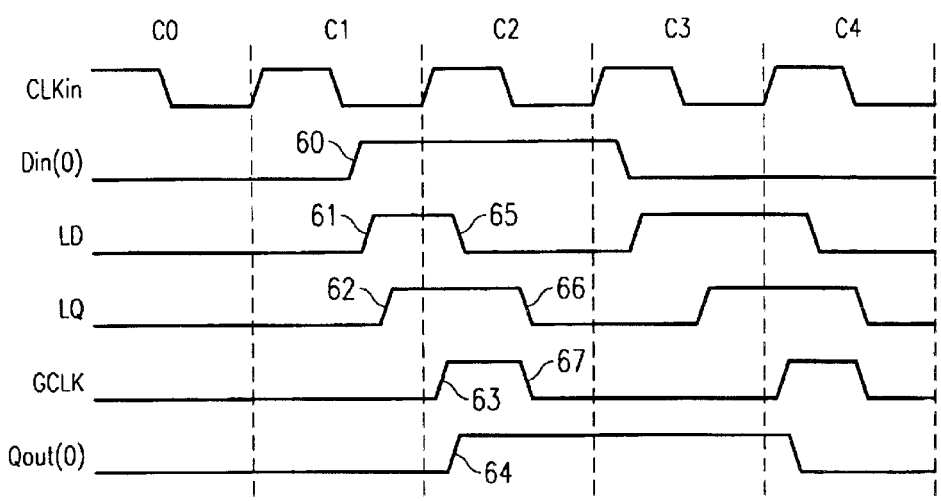
FIG. 7 shows the logic timing diagram for the preferred data-driven clock gating circuit.

Turning now to FIG. 7 and in conjunction with FIG. 5, a timing diagram is shown which illustrates the timing of some of the signals in the preferred data-driven clock-gating circuit of FIG. 5. For simplicity, only one channel of the data bus (channel 0) is shown. The timing of the other bus channels is the same, although it should be noted that the process by which the preferred embodiment generates the gated clock signal is initiated by whichever XOR gate 140–143 first detects a data bit change.

In FIG. 7, the input clock signal CLKin is a periodic clock signal generated by a clock source (not shown). Five cycles of the input clock signal (C0–C4) are shown. The input data on channel 0, Din(0), is independently generated by the transmission source (e.g., a bus master) and the preferred embodiment preferably responds to changes in this data as discussed above. As shown, the data changes during the low-clock portion of cycle C1 (60). At this point, XOR gate 140 will detect this change and generate a logic high signal that is propagated through OR gates 45 and 47 to the input of latch 30 as signal LD (61). In the timing diagram of FIG. 6, LD is high when CLKin is low and, therefore, latch 30 will capture LD and propagate it as output LQ (62). When LQ and CLKin are both high, AND gate 20 will generate a high GCLK signal (63), which causes flip-flop 40 to capture Din(0) and forward the data to output Qout(0) (64). When GCLK is asserted high (63), all other flip-flops 41–43 will latch their associated data bits Din(1), Din(2) and Din(3) as well.

When Qout(0) and Din(0) are once again equal at the logic high state, the output of XOR gate 140 and signal LD return to a low level (65). Signal LQ follows LD at the subsequent low CLKin value (66) and GCLK returns to a low level when either CLKin or LD become low (67). At this point, the circuit is in its natural, non-switching state and waits once again for a change in a bit on the data bus. For example, a subsequent change in data channel Din(0) from high to low initiates the same gated clock enabling process as discussed above and the timing diagram in FIG. 7 reflects the same procedure.

Figure 1:
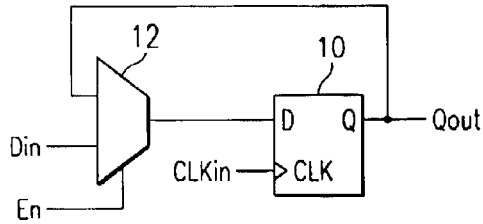
FIG. 1 shows a conventional synchronous load-enable clocking circuit.
Figure 2:
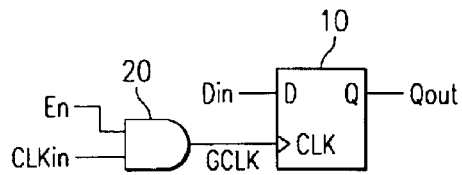
FIG. 2 shows a conventional clock gated clocking circuit.
Figure 3:
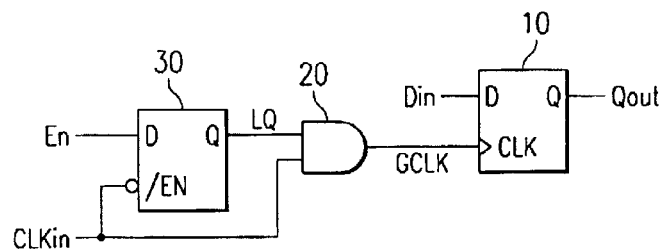
FIG. 3 shows the clocking circuit of FIG. 2 supplemented by an enable signal latch.

The preferred embodiment heretofore discussed provides an efficient mechanism for capturing data from a data bus using an input register that is triggered by changes in the data. The preferred embodiment advantageously eliminates the need to generate a separate enable signal via control circuitry or a state machine. The preferred embodiment can be included in numerous types of sequential device circuits. Furthermore, the preferred embodiment can be used in conjunction with other clock-gating schemes such as the conventional clocking circuits shown in FIGS. 1–3. An alternative embodiment can combine a conventional externally generated enable signal and the data-driven enable signal disclosed to advantageously provide additional assurance that the incoming data is latched only when the device that generated the data indicates that the data is valid and new data is actually present on the bus. For example, the clock logic 102 can be modified from that shown in FIGS. 5 and 6 to permit an external data valid signal to be received from the external data generation device. Such an externally generated data valid signal may be asserted by an external device to indicate that new data is ready on the bus, Din(N), and can be latched by flip-flops 40–43. The clock logic 102 may generate the gated clock signal only when the comparison logic 100 asserts the LD signal, based on its own independent determination that new data is present on the bus, and the external device asserts the data valid signal. An AND gate can be included in clock logic 100 to logically AND together both signals before permitting the GCLK signal to clock the flip-flops.

Another advantage inherent in the preferred embodiment is that data groups as small as four bits ("nibble") or eight bits ("word") can be gated using a separate GCLK signal. The use of two or four-input OR gates to propagate signals from the various XOR gates make it practical to combine the latches in even-numbered groups. For instance, a 32-bit address can be split into four groups of 8 bit words, each with its own GCLK signal (e.g., GCLK0–GCLK3). Each GCLK signal is generated only when data in the 8-bit word changes. Thus, data changes in a given word will not cause the other words in the 32-bit address to be latched. This configuration is useful in data registers that handle incremental type data patterns such as addresses or counters where more significant bits change less frequently.

As one of ordinary skill in the art will recognize, the embodiments of the data driven clock gating circuit discussed above can be implemented in a processor, such as digital signal processor (DSP). As is well known, a DSP typically includes a core, memory, other components, and one or more busses interconnecting such components. As such, the data driven clock gating scheme described herein can be used to latch one or more of the bits associated with one or more of the various busses in the DSP.

The above discussion is meant to be illustrative of the principles and various embodiments of the present invention. Numerous variations and modifications will become apparent to those skilled in the art once the above disclosure is fully appreciated. For instance, it is feasible that the preferred embodiment may be used to capture data that is not contiguous or that arrives at completely different register banks. If the same data is transmitted to different registers, then the gated clock signal generated by the preferred embodiment may simply be routed to the appropriate flip-flops. It is intended that the following claims be interpreted to embrace all such variations and modifications.

What is claimed is:

1. A circuit for capturing data on a bus, comprising: a plurality of flip-flops, each of said flip-flops receiving an input data bit and producing an output data bit upon assertion of a gated clock signal;

comparison logic coupled to said flip-flops, said comparison logic determining whether any of said input data bits change state, wherein said comparison logic receives the input data bit and output data bit from each of said flip-flops and compares the logic states of said input data bit and output data bit from each of said flip-flops and, if the logic states of said bits do not match, asserts an enable signal to indicate that at least one of said input data bits has changed state; and clock logic that receives said enable signal and an external clock signal and generates the gated clock signal based on the logic state of the enable signal and external clock signal.

2. The circuit of claim 1 wherein said comparison logic asserts said enable signal when any of said input data bits change state.

3. The circuit of claim 1 wherein said comparison logic includes an exclusive OR gate coupled to said flip-flop.

4. The circuit of claim 3 wherein said exclusive OR gate includes two inputs and said input data is provided to one of said exclusive OR gate inputs and said output data bit from said flip-flop is provided to the other of said inputs.

5. The circuit of claim 2 further including a plurality of flip-flops, each flip-flop dedicated to capturing an input data bit and each flip-flop is coupled to an exclusive OR gate which determines whether any of said input data bits change state.

6. The circuit of claim 1 wherein the clock logic comprises a synchronous load-enable clock circuit.

7. The circuit of claim 1 wherein the clock logic comprises a gated clock circuit.

8. The circuit claim 1 wherein said comparison logic includes an exclusive NOR gate coupled to said flip-flop.

9. The circuit of claim 8 wherein said exclusive NOR gate includes two inputs and said input data is provided to one of the inputs of said exclusive NOR gate and said output data bit from said flip-flop is provided to the other of said inputs.

10. The circuit of claim 9 further including a plurality of flip-flops, each flip-flop dedicated to latching an input data bit and each flip-flop coupled to an exclusive NOR gate which determines whether any of said input data bits change state.

11. The circuit of claim 1 wherein the clock logic comprises a clock latch that receives the enable signal as input signal and latches the state of the enable signal upon assertion of the external clock signal.

12. The circuit of claim 11 wherein said clock logic also includes a logic gate that receives as input signals the latched output signal from said clock latch and the external clock signal, said logic gate provides the gated clock signal at its output.

13. The circuit of claim 1 wherein said clock logic receives an external data valid signal and asserts the gated clock signal only when both the data valid signal and the enable signals are asserted.

14. A method of latching a plurality of bits of data from a multi-bit bus, comprising:

(a) comparing each of the plurality of bits of data that was previously latched from the bus to its corresponding bit of current data on the bus; and (b) latching each of the plurality of bits of the current bus data only if at least one of the plurality of bits of the previously latched data is different from its corresponding bit of current bus data.

15. The method of claim 14 wherein (b) includes generating a clock signal only if at least one of the plurality of bits of the previously latched data is different from its corresponding bit of current bus data, said clock signal is used to latch each of the plurality of bits of the current bus data.

16. A circuit to latch data, comprising:

means for latching a plurality of input data bits;

means coupled to said means for latching the plurality of input data bits for determining whether at least one of the plurality of input data bits has changed logic state; and means coupled to said means for latching the plurality of input data bits and to said means for determining whether at least one of the plurality of input data bits has changed logic state for generating a clock signal when at least one of the plurality of input data bits has changed logic state.

* * * * *